United States Patent [19]

Stangeland

[11] Patent Number: 5,740,868

[45] Date of Patent: Apr. 21, 1998

[54] PRESSURE CONTROL CIRCUIT FOR A COMBINATION OF A REVERSIBLE PLOUGH WITH A PLURALITY OF SOIL PREPARATION DEVICES COUPLED THEREWITH

[75] Inventor: Kjell-Egil Stangeland, Kleppe, Norway

[73] Assignee: Kverneland Klepp AS, Kverneland, Norway

[21] Appl. No.: 592,322

[22] PCT Filed: Jun. 1, 1995

[86] PCT No.: PCT/GB95/01270

§ 371 Date: Apr. 1, 1996

§ 102(e) Date: Apr. 1, 1996

[87] PCT Pub. No.: WO95/33364

PCT Pub. Date: Dec. 14, 1995

[30] Foreign Application Priority Data

Jun. 4, 1994 [GB] United Kingdom .................. 9411213

[51] Int. Cl.[6] .................................................. A01B 3/28
[52] U.S. Cl. ........................... 172/219; 172/162; 172/218
[58] Field of Search ............................... 172/204, 205, 172/202, 141, 162, 320, 318, 460, 459, 461, 468, 469, 471, 536, 538, 219; 91/508, 170 R, 178, 532; 111/54–57, 162, 283, 218

[56] References Cited

U.S. PATENT DOCUMENTS

| 3,245,479 | 4/1966 | Dlugosch et al. ............... 172/202 X |
| 3,263,757 | 8/1966 | Kaster ............................... 172/202 X |
| 3,340,936 | 9/1967 | Godbersen ........................... 172/202 |
| 3,476,191 | 11/1969 | Schlabs ............................. 172/202 |
| 3,502,002 | 3/1970 | Whiteman, Jr. ..................... 91/178 |
| 3,503,452 | 3/1970 | Godbersen ........................... 172/202 |
| 3,539,015 | 11/1970 | Schlabs ............................. 172/202 |
| 3,566,974 | 3/1971 | Kopaska ............................. 172/202 |
| 3,627,059 | 12/1971 | Jackson et al. .................... 172/68 X |
| 3,744,373 | 7/1973 | Leijon ................................ 91/178 |
| 3,757,872 | 9/1973 | Mellen ............................... 172/225 |
| 3,830,312 | 8/1974 | Brandly ............................. 172/225 |
| 3,991,832 | 11/1976 | Cooper ............................... 91/178 X |
| 4,095,436 | 6/1978 | Heitkamp et al. ............... 91/170 R X |
| 4,215,622 | 8/1980 | Chichester ......................... 91/508 |
| 4,273,197 | 6/1981 | Hawes ............................... 172/225 |
| 4,415,040 | 11/1983 | Salva ................................. 172/225 |
| 4,640,367 | 2/1987 | Lawrence et al. ................. 172/225 |
| 4,646,849 | 3/1987 | Watvedt ............................. 172/225 |
| 4,687,065 | 8/1987 | Cope et al. ........................ 172/202 X |
| 4,691,785 | 9/1987 | Post ................................... 172/225 X |
| 4,778,013 | 10/1988 | Van Der Lely ..................... 172/225 |
| 4,825,955 | 5/1989 | Watvedt ............................. 172/225 X |
| 4,896,731 | 1/1990 | Besson .............................. 172/225 |
| 5,381,866 | 1/1995 | Mong ................................. 172/225 X |
| 5,427,182 | 6/1995 | Winter ............................... 172/2 |

FOREIGN PATENT DOCUMENTS

| 0180261 | 9/1985 | European Pat. Off. ........ A01B 49/02 |
| W087/05777 | 10/1987 | WIPO .............................. A01B 17/00 |
| WO95/02315 | 1/1995 | WIPO .............................. A01B 17/00 |

Primary Examiner—Terry Lee Melius
Assistant Examiner—Victor Batson
Attorney, Agent, or Firm—Sheridan Ross P.C.

[57] ABSTRACT

A combination of a reversible plough with a plurality of soil preparation devices including an improved height control system. The apparatus includes a headstock by means of which the combination can be mounted on lifting arms at the rear of a propelling vehicle. The soil preparation devices are each mounted on a movable part of a plough frame via a respective swivel coupling that allows the device to be towed and also to be suspended during plough body reversal. A common hydraulic pressure control circuit is provided to control the height of each soil preparation device relative to its respective swivel coupling, and to provide automatic self-compensating adjustment of each device as they follow the contour of the ground.

5 Claims, 7 Drawing Sheets

5,740,868

PRESSURE CONTROL CIRCUIT FOR A COMBINATION OF A REVERSIBLE PLOUGH WITH A PLURALITY OF SOIL PREPARATION DEVICES COUPLED THEREWITH

FIELD OF THE INVENTION

This invention relates to a pressure control circuit for a combination of a reversible plough with a plurality of soil preparation devices coupled therewith, in which each device is adapted to be trailed behind the plough via a pivotable coupling which defines a substantially horizontal swivel axis extending generally parallel to the direction of travel.

In particular, the invention has been developed in connection with a reversible plough / multiple soil preparation device combination, in which a number of separate devices are mounted at suitable mounting points on movable parts of a frame of a reversible plough. Preferably, the soil preparation devices comprise "packers".

BACKGROUND OF THE INVENTION

As is well known, a reversible plough usually comprises a headstock (by which the plough is attached to the lifting arms at the rear of a tractor), a carrying beam, and a set of pairs of reversible plough bodies mounted at positions spaced apart along the length of the beam, and which can be reversed in order that the plough body of each pair which happens to be in a lowered ploughing position can be rotated through about 180° so as to be in an uppermost inoperative position, and the previously uppermost ploughing body can then be brought to the lowered ploughing position.

When packers are mounted individually on movable parts of a frame of a reversible plough, this may be carried out using swivel coupling and as disclosed in, for example, the Packomat brochure of Kverneland Klepp published May 1993, or as shown in more detail in Swedish patent application No 920074-2 and European patent application No 93103829.3 (publication No 0560319A).

The a swivel coupling which is used to couple a packer to a movable packer arm (or other movable part of the frame of a reversible plough) serves to form a towing connection which allows the packer to be towed behind the plough, but which also allows the packer to be raised from the ground and to maintain a substantially horizontal attitude while the packer is adjusted from a soil working position at one side of the plough, to a soil working position at the other side of the plough, when plough body reversal takes place.

During normal operation, the mass of the packer acts via its packer rings to break-up the soil turned-over previously by the plough bodies, and so as to make the ground ready for seeding.

In existing designs of packer, the weight of the packer is borne partly by the engagement of the packer rings with the ground (to support the rear end of the packer), and also by the swivel coupling of the packer to the plough frame, which supports the front end of the packer.

It is known to provide a height control adjustment which is manually operated, and which can serve to adjust the height of each packer relative to the swivel coupling and thereby adjust the downward pressure exerted by the packer on the ground. However, once the adjustment has been set for each packer, the combination of reversible plough (which may comprise more than one plough section) and a set of multiple packers coupled therewith is a rigid assembly, and which is not able to adjust itself to compensate for undulations, bumps and troughs in the ground surface which is being ploughed and packed.

Thus, if, for example, one packer of the set engages a hump in the ground, (or is travelling over a ground surface which is higher relative to the ground ahead of the packer which is currently being ploughed), this will cause the packer to move upwardly relative to the plough frame and therefore, via the swivel coupling, the entire plough frame is liable to follow at least part of the upward movement of the packer.

This is disadvantageous for two reasons: first of all it may lift at least some of the plough bodies by an undesired amount so that non-uniform ploughing is carried out by the plough bodies i.e. some plough bodies will be ploughing to an undesirably shallower depth than the other plough bodies; and secondly the other packers also will tend to be lifted via the plough frame and their respective swivel mountings. In practice, some of this tendency for upward movement of any given packer is absorbed by flexing of various packer arms, and by parts of the plough frame, but there will still be transmitted undesired amounts of upward movement to the plough bodies and the other packers of the combination, and the effects of which will be further worsened if it coincides (which it may do from time to time) with the plough bodies or other packers encountering "low points" or hollows in the ground at the same time as the packer (which caused this upward movement) hits the obstacle.

SUMMARY OF THE INVENTION

The present invention therefore seeks to provide an improved height control system for the soil preparation devices of a multiple device/reversible plough combination, in which a self adjusting action can be obtained to compensate for individual up/down movements of the soil preparation devices relative to their swivel mountings.

According to the invention there is provided a combination of a reversible plough with a plurality of soil preparation devices coupled therewith, said combination comprising:

a headstock by means of which the combination can be mounted on the lifting arms at the rear of a propelling vehicle;

a plough frame including a carrying beam, mounted on said headstock;

a number of pairs of reversible plough bodies, mounted on the carrying beam, and rotatable through approximately 180° in order to reverse the plough bodies of each pair; and, a number of soil preparation devices each mounted on a movable part of the plough frame via a respective swivel coupling which allows the device to be towed and also to be suspended therefrom during plough body reversal, and which coupling also defines a substantially horizontal swivel axis extending generally parallel to the direction of travel and about which the device can pivot during plough body reversal;

characterised in that a common hydraulic pressure control circuit is provided to control the height of each device relative to the respective swivel coupling, and in that said circuit comprises respective actuator cylinders associated one with each device and arranged to adjust the height of the working elements of each device relative to the swivel mounting, said cylinders being in fluid communication with each other whereby relative adjustment movement of one cylinder (as a consequence of upward or downward movement of the respective device to follow the contour of the ground) causes automatic compensating adjustment of the other actuator cylinder(s).

The common hydraulic pressure control circuit therefore provides automatic self-compensating adjustment of the actuator cylinders, when the respective soil preparation device move up and/or down relative to their swivel couplings as they follow the contour of the ground.

Thus, by way of example only, assuming the combination to be travelling over level ground, and one device encounters an obstacle which causes the device to tend to lift relative to its swivel coupling, instead of the full upward thrust being transferred to the plough frame via its swivel coupling, compensating flows of hydraulic fluid are passed to the other actuator cylinder(s) which will tend to push the other device(s) downwardly, and with a correspondingly increased upward thrust on the plough frame via its swivel coupling. By this means, assuming, say, that there are three devices (preferably "packers"), instead of one large upward force being applied to the plough frame at one location only, via the swivel coupling of the packer which encounters the obstacle, this force is replaced by three upward forces, each of about one third of the value, and each at different locations on the plough frame. These lower forces have a smaller influence on the plough frame, and in addition may be at least partly absorbed by inherent flexibility of the beam components of the frame of the plough, or of specially designed packer arms, if provided.

A similar self-compensating adjustment will take place in the event of one of the packers entering a hollow in the ground, causing it to lower itself relative to its swivel coupling.

Therefore, the self-adjusting capability of the actuator cylinders in the common hydraulic circuit reduces the impact on the plough frame of any obstacle being struck by any one of the packers, and also tends to equalize the pressure in the actuator cylinders and therefore the pressure exerted on the ground by the packers.

Reference has been made above to the provision, in a combination according to the invention, of actuator cylinders associated one with each packer. An actuator cylinder will usually comprise an assembly of cylinder, piston and piston rod, and upon the application of hydraulic fluid pressure to one, or the other side of the piston within the cylinder will result in relative extension or contraction of the overall length of the piston/cylinder assembly. The manner by which the assembly is mounted in position is not critical, and the piston rod may be fixed, and the cylinder arranged to move relative thereto, or vice versa. Both these arrangements are intended to be included within the definition above of "relative adjustment movement of an actuator cylinder".

The type of reversible plough/multiple packer combination with which the invention may be used is not critical, provided only that the plough is a reversible plough, which may be of the fully mounted, or semi-mounted type, and which may have more than one separate ploughing section, and provided also that there is two or more separate packers each mounted on the plough frame via respective swivel couplings which allow each packer to move from one side to the other during each plough body reversal operation.

In a particularly preferred development, the invention also includes the possibility that each packer may be integrated with a seed distribution unit, such unit forming an integral part of the packer in the sense that it is coupled rigidly therewith, and is capable of moving with the packer during the adjustment of working position of the packer caused by plough body reversal.

The preferred fluid medium used to operate the actuator cylinders comprises hydraulic fluid, but other fluids may be used, including compressed gas, possibly in conjunction with an accumulator.

A preferred embodiment of reversible plough/multiple packer combination according to the invention will now be described in detail, by way of example only, with reference to the accompanying drawings:

DESCRIPTION OF THE INVENTION

Figure 1:
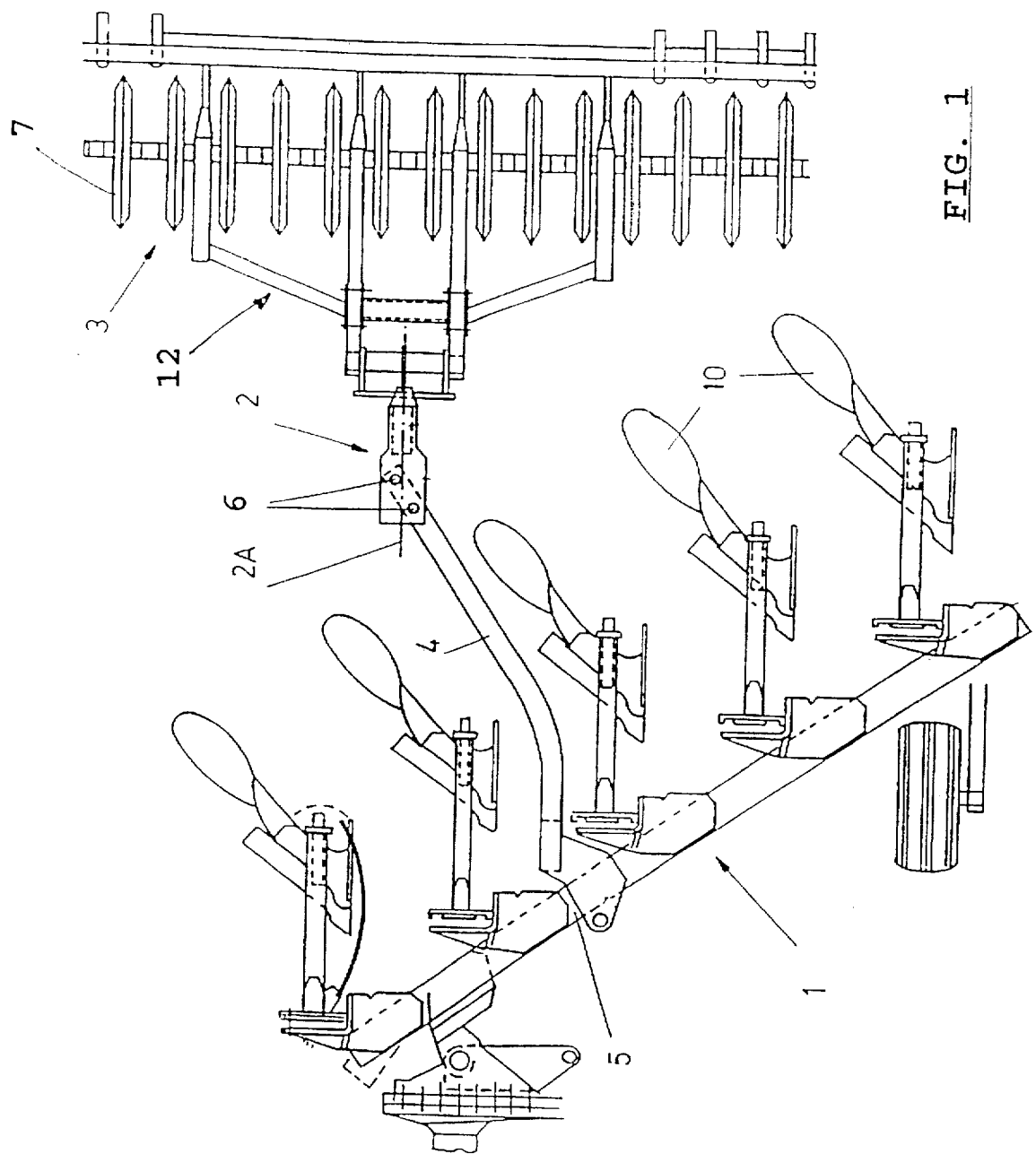
FIG. 1 is a plan view of part of a multiple packer/reversible plough combination to which the invention may be applied.

Referring now to the drawings, description will first be made of a general type of reversible plough/packer combination to which the invention may be applied, with reference to FIGS. 1 and 2 of the drawings. These figures of drawings are taken from published EP 0560319, and for fuller disclosure of the constructional and operational features of the combination, reference should be had to this EP publication.

The reversible plough/packer combination comprises a fully mounted plough 1 having reversible plough bodies 10, and an integrated packer 3 towed behind the frame of the plough via a swivel coupling 2. The plough 1 has a carrying beam 5 coupled with a usual headstock by which the plough is coupled to the rear lifting arms of a tractor, and a packer arm 4 projects rearwardly from beam 5 and on the trailing end 6 of arm 4 the swivel coupling 2 is mounted, and which forms a towing connection for packer 3, and also defines a horizontal swivel axis 2A about which the packer 3 can pivot during plough body reversal, when beam 5 is rotated through approximately 180° relative to the headstock.

The packer 3 is able to follow the rotational movement of the beam 5, by being lifted upwardly from the ground, and then moving laterally before being lowered to the ground again, on an opposite side, and available to cooperate with the other plough body of each pair of reversible ploughs.

Figure 2:
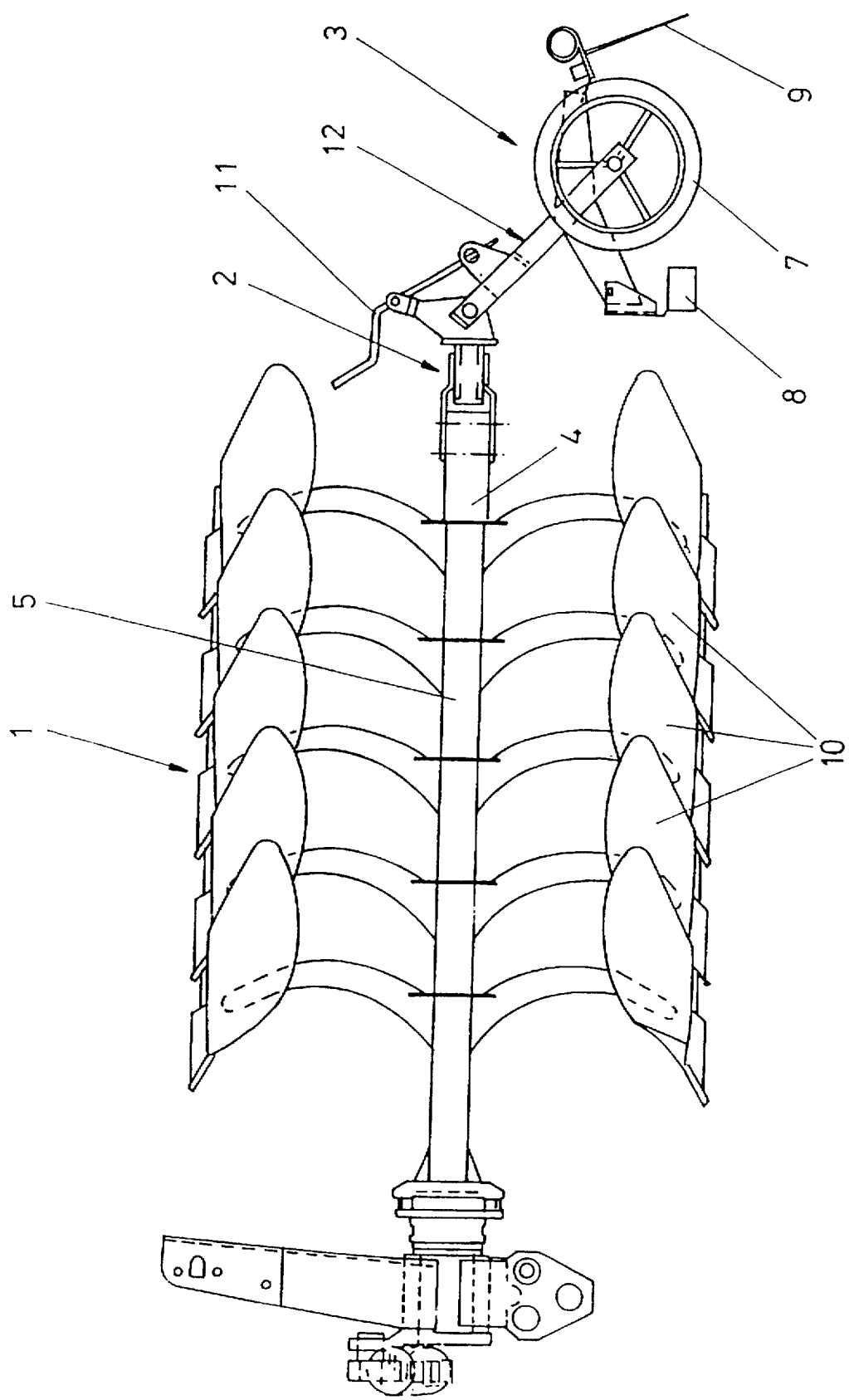
FIG. 2 is a side view corresponding to FIG. 1.

FIG. 1 is a plan view of the reversible plough/packer combination, and FIG. 2 shows a side view. The packer 3 has a usual set of packer rings 7 which break down the soil previously turned over by the plough bodies 10, and the soil preparation action carried out by the rings 7 is achieved mainly by the weight of the packer. As can be seen from FIG. 2, a manually operated adjusting device 11 is provided, which can alter the inclination of a mounting frame 12 which mounts the packer rings 7 on the swivel coupling 2, and operation of adjustment control 11 allows the angle of the mounting frame 12 to be adjusted, in order to raise or lower the packer rings 7 relative to the swivel coupling. This enables the crumbling force exerted by the packer rings 7 to be altered to suit requirements, although evidently it will be undesirable to lower the packer rings 7 too much relative to swivel coupling 2, since this may tend to lift the plough beam 5, and therefore raise at least some of the ploughing bodies 10 to a ploughing depth which is too shallow for requirements.

FIGS. 1 and 2 show a single section of a reversible plough, and one packer integrated therewith to form a reversible plough/packer combination, and this is to set-out the background to subsequent description of preferred embodiments of the invention. Preferred embodiments of the invention comprise a combination of a reversible plough, with more than one ploughing section, and a number of separate packers integrated therewith. This is shown schematically only in FIG. 4 of the drawings, which comprises tractor 30 which is propelling a two-part reversible plough combination comprising a plough frame including forward section 31, intermediate section 32 and rear section 33, which are coupled together in known manner. Also, respective packers 31a and 33a are coupled with plough sections 31 and 33. At least forward section 31 and rear section 33 carry reversible plough bodies, which can together be adjusted between left side ploughing and right side ploughing, by operation of a suitable driver control, which adjusts the plough bodies in each section to rotate through about 180°, all of this being well known to those of ordinary skill in the art, and not described in detail herein. The respective packers also adjusted at the same time as the plough frame sections.

Figure 3:
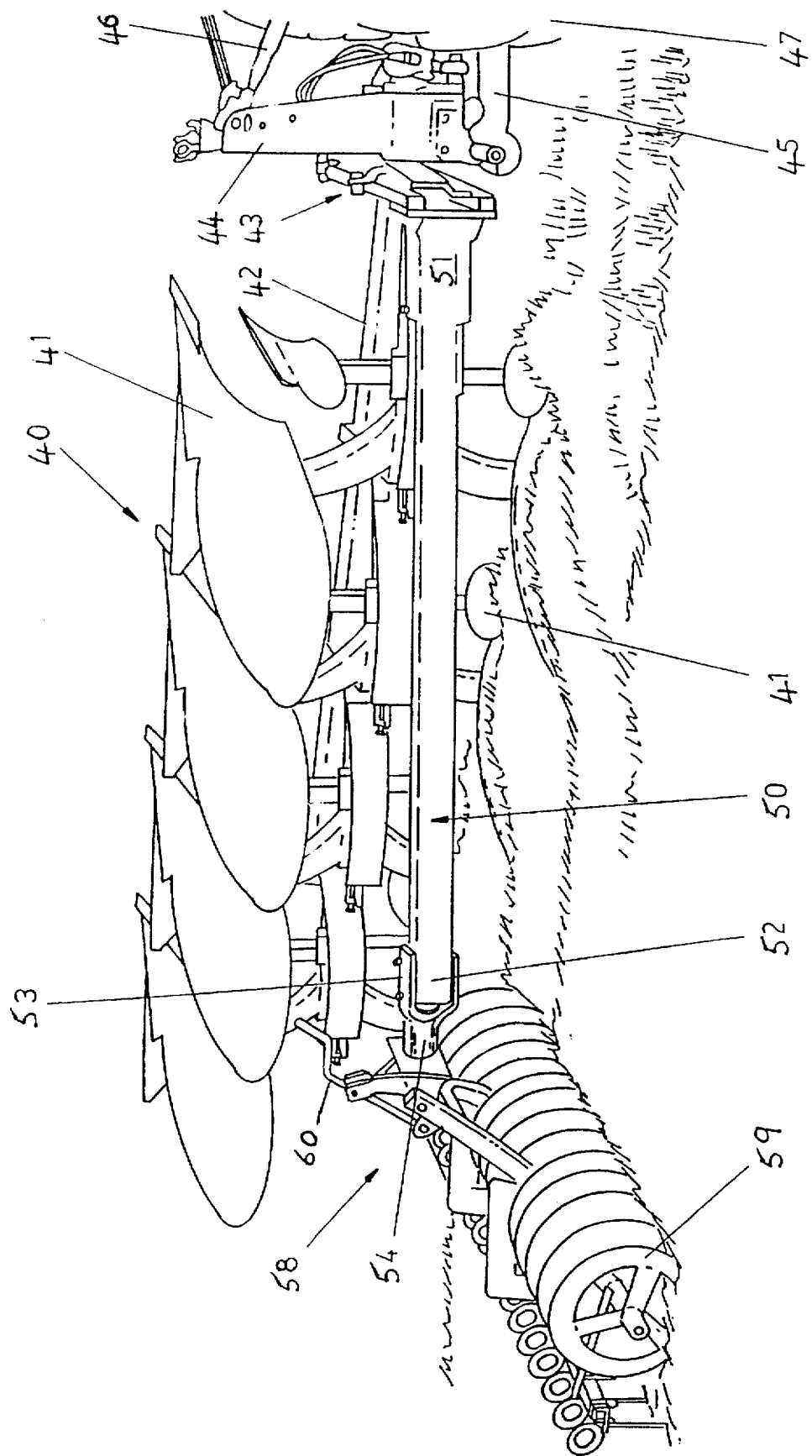
FIG. 3 is a perspective view from one side of part of a further type of multiple packer/reversible plough combination to which the invention may be applied.
Figure 4:
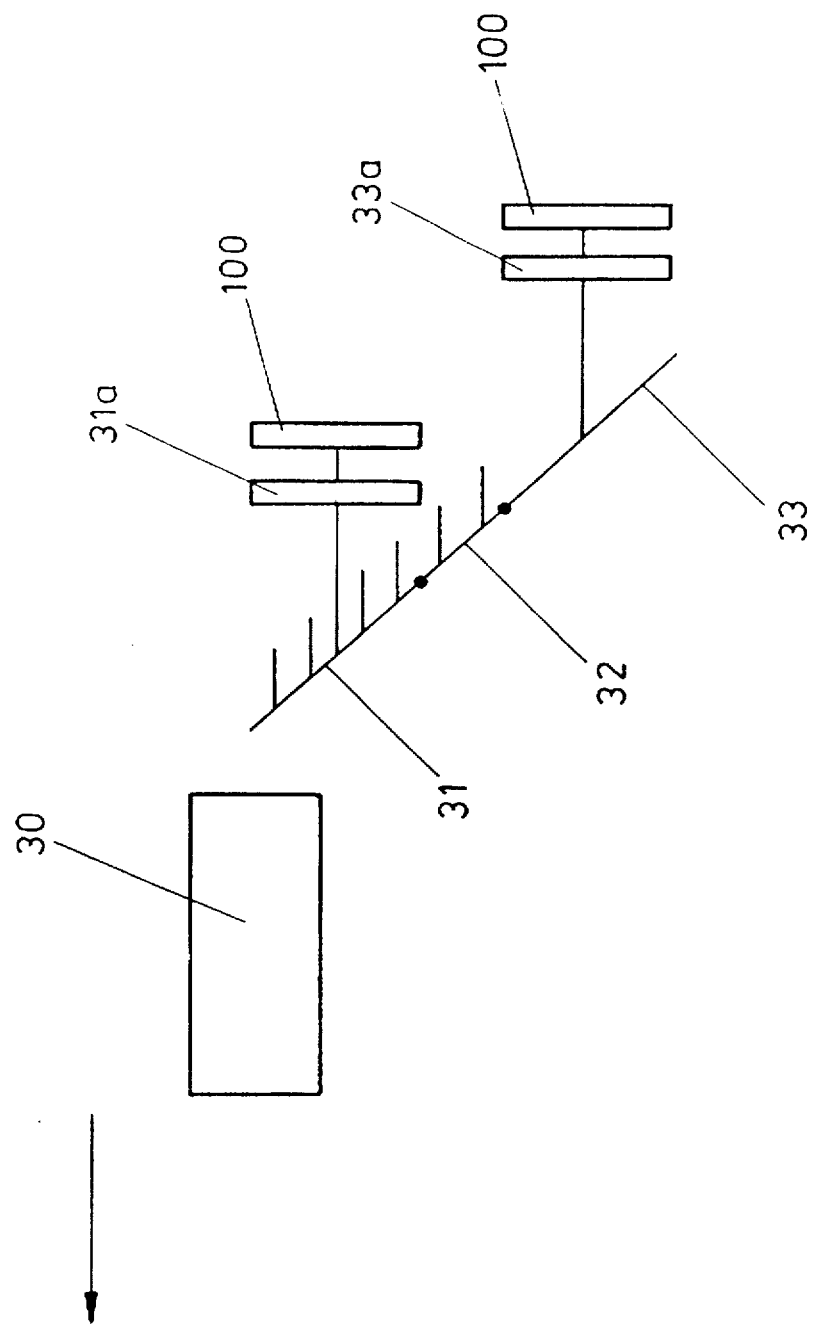
FIG. 4 is a diagrammatic plan view of a multiple packer/reversible plough combination which may incorporate the invention.

Referring now to FIG. 3, this shows a further example of an integrated reversible plough/packer combination, to which the invention may be applied, when such combination is built-up to form a multiple packer/reversible plough combination, e.g. as shown schematically in FIG. 4.

In FIG. 3, a reversible plough designated generally by reference 40 has reversible plough bodies 41 mounted on beam 42, which in turn is mounted at its forward end on headstock 44 via a transverse coupling block 43. Headstock 44 is mounted on lifting arms 45 and top link 46 at the rear of a tractor, the rear wheels of which are shown in part outline by reference 47.

A packer arm 50 is mounted at its forward end 51 on coupling block 43 also, and has a swivel coupling 53 mounted at its rear end 52 via which packer 58 is mounted. The swivel coupling 53 includes a mounting tube 54 which defines a horizontal swivel axis about which packer 58 can swivel during plough body reversal. Packer rings 59 are shown, as well as manual adjustment control 60 for adjusting the height of the packer rings 59 relative to swivel coupling 53.

Plough body reversal takes place by rotating coupling block 43 about a substantially horizontal axis, defined by headstock 44, and through approximately 180°, and this raises the presently lowermost plough body 41 to an inoperative position, and rotates the presently uppermost plough body to the lowered ploughing position. At the same time as plough beam 42 carries out this rotation, to effect plough body reversal, packer arm 50 also rotates through 180°, and this lifts the packer 58, moves it laterally, and then lowers it to the ground on the opposite side, to cooperate with the plough bodies 41 which are now in the ploughing position.

Figure 5:
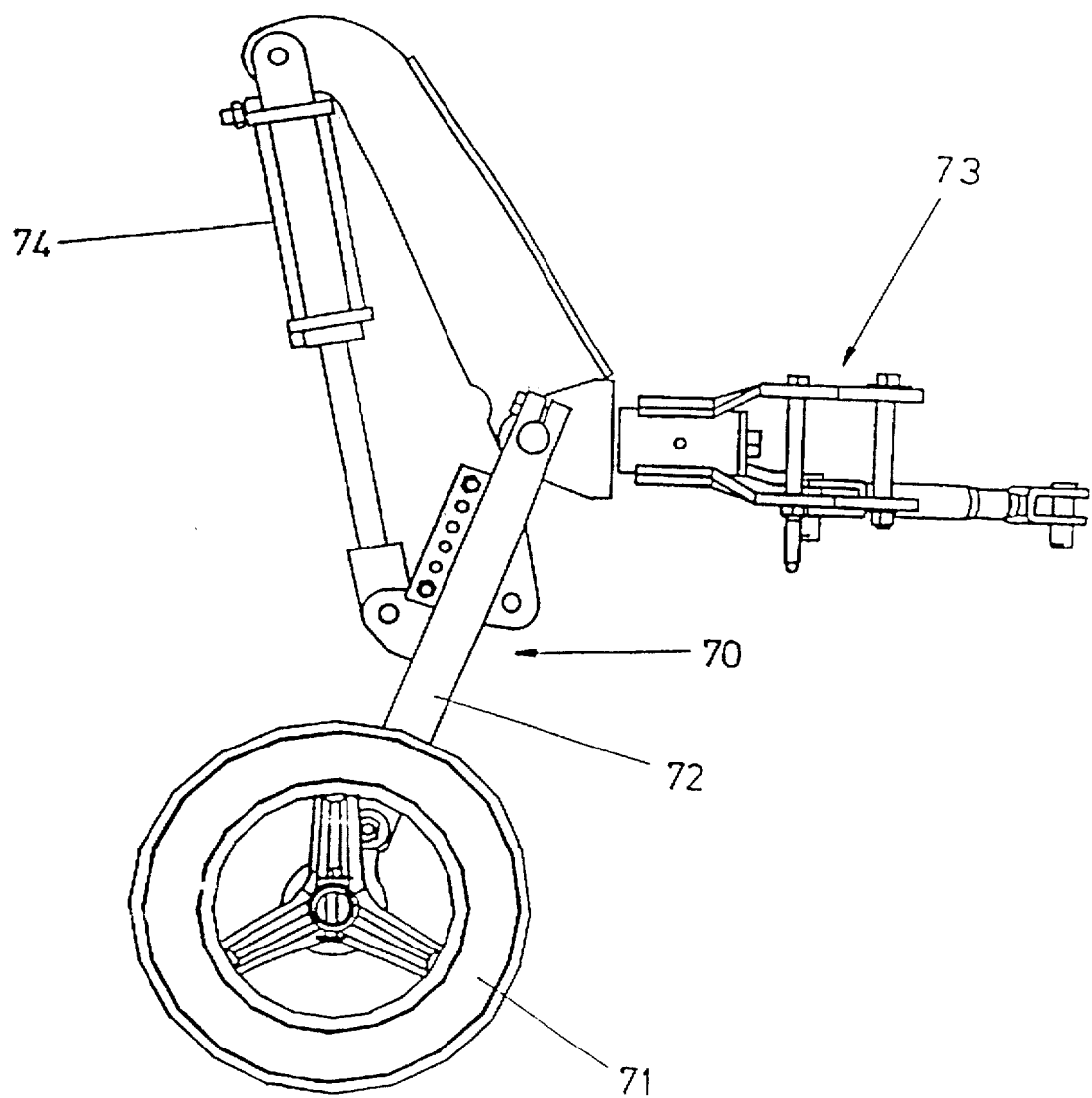
FIG. 5 is a side view corresponding to FIG. 6.
Figure 6:
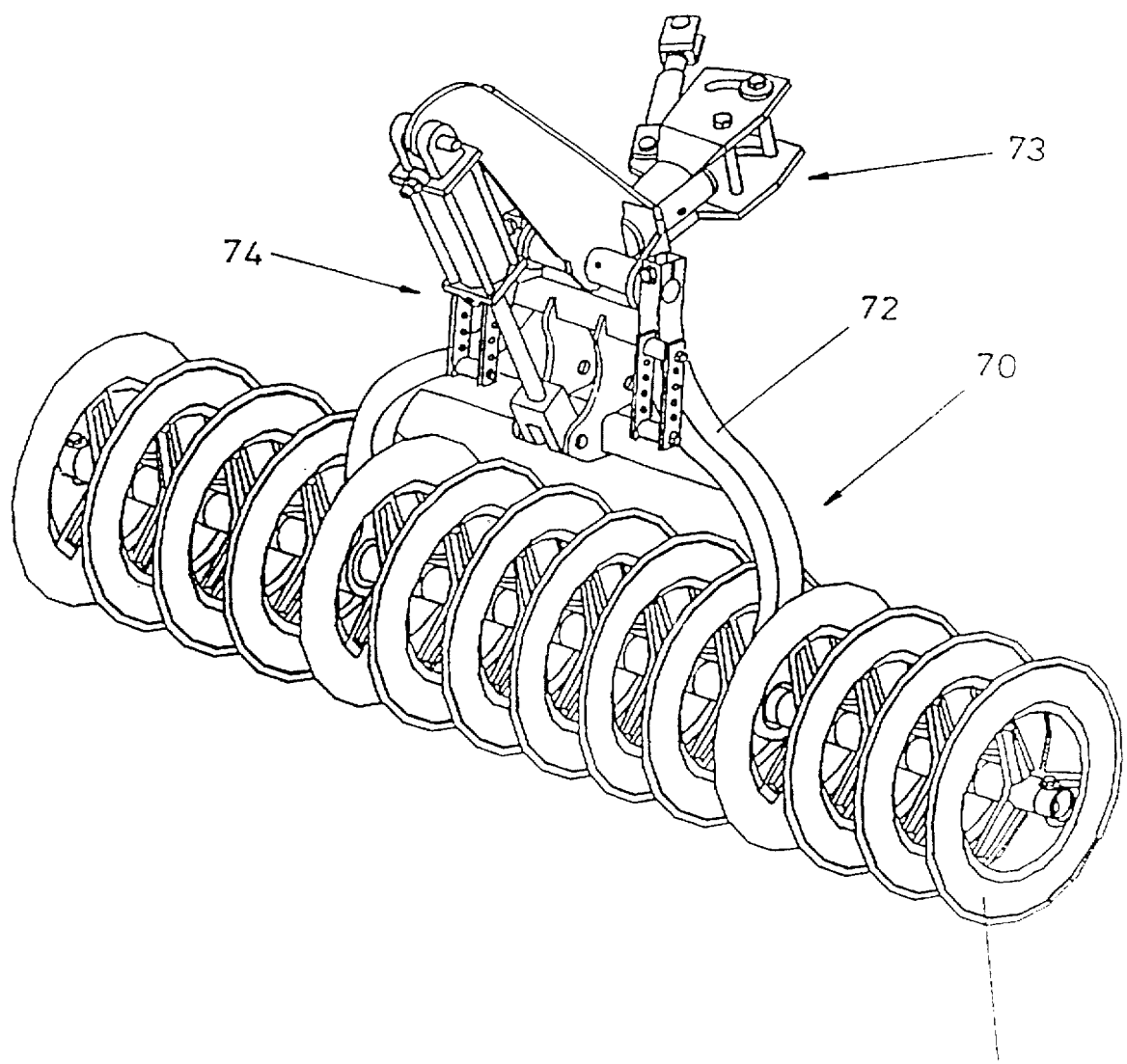
FIG. 6 is a perspective illustration from the rear of a packer which may be incorporated or integrated within a multiple packer/reversible plough combination according to the invention.
Figure 7:
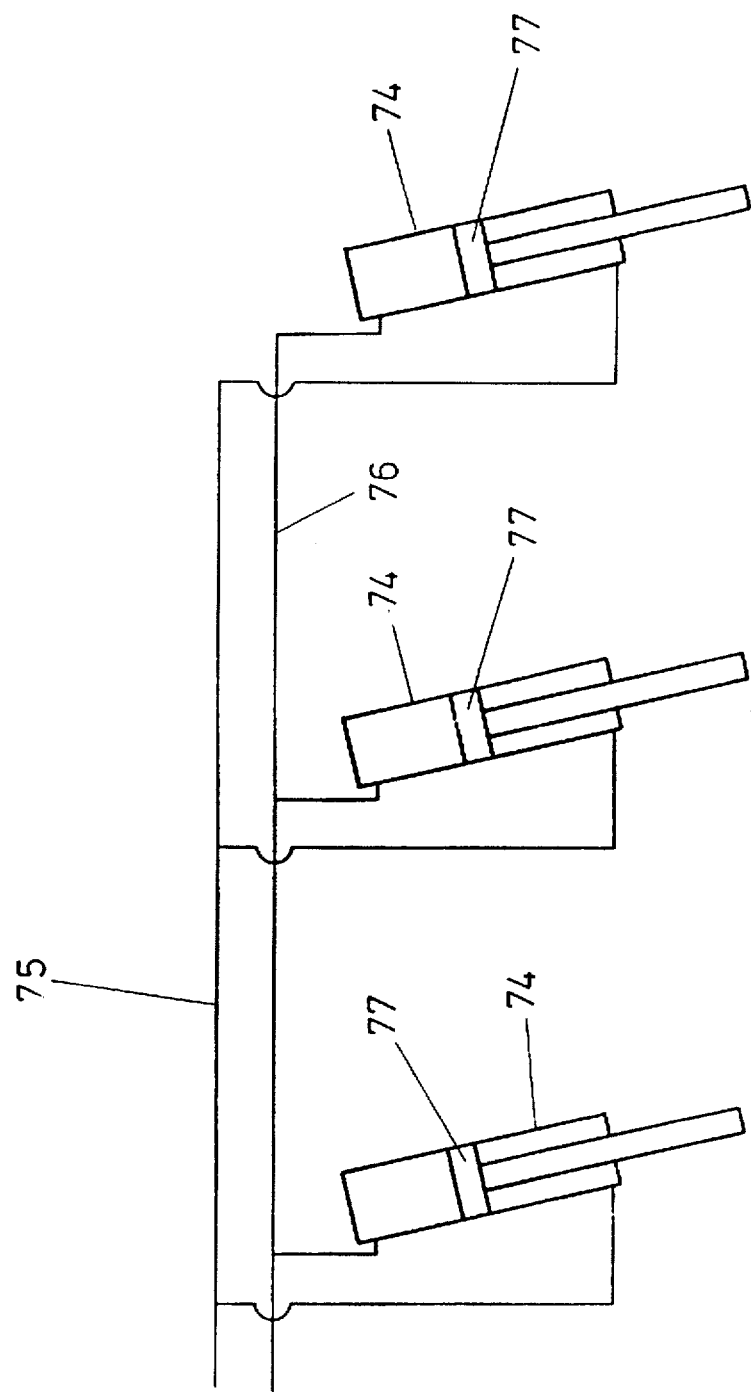
FIG. 7 is a diagrammatic illustration of a common pressure control circuit and actuator cylinders for controlling the height of a set of packers integrated into a packer/reversible plough combination according to the invention.

Referring now to FIGS. 5 to 7 of the drawings, this shows a preferred embodiment of packer, and a hydraulic pressure control circuit for controlling the height of the packer rings relative to the swivel coupling, and for controlling the ground pressure. Only a single packer is shown in FIGS. 5 and 6, whereas FIG. 7 shows part of a hydraulic control circuit, which is used to control the height of a set of separate packers which are intended to be integrated within a multiple packer/reversible plough combination according to the invention.

Referring first to FIGS. 5 and 6, the packer is designated generally by reference 70 and comprises packer rings 71 mounted on a common horizontal axle and carried by a mounting frame 72 which is pivotally connected at its upper end to a swivel coupling 73. The swivel coupling 73 can be mounted on the end of a packer arm, or any other movable part of the frame of a reversible plough section with which the packer 70 is to be integrated. Although not shown, two or more packers 70 will be integrated with corresponding reversible plough sections to form a multiple packer/ reversible plough combination according to the invention.

For the sake of example only, it will be assumed that three packers 70 are integrated into the combination, and a common hydraulic pressure control circuit is provided, part of which is illustrated in FIG. 7, and which serves to control the height of each packer 70 relative to the respective swivel mounting 73. The circuit comprises respective actuator cylinders associated one with each packer, and which is arranged to adjust the height of the working elements (rings 71) of each packer relative to the swivel mounting 73. An actuator cylinder is shown by reference 74 in FIGS. 5 and 6, which comprises an assembly of cylinder, piston rod and piston which are relatively movable in order to lengthen or shorten the overall length of the assembly, when it is required to adjust the height of the packer rings 71 relative to the swivel coupling 73 by pivoting about the generally horizontal pivot connection between frame 72 and the coupling 73.

As can be seen in FIG. 7, the actuator cylinders 74 are in fluid communication with each other via common pressure lines 75 and 76 so that the pressure in each cylinder chamber below pistons 77 communicate with common pressure line 75, whereas the cylinder chambers above the pistons 77 communicate with each other via common pressure line 76.

Therefore, in the event of relative adjustment movement of one of the cylinders 74, as a consequence of upward or downward movement of the respective packer to follow the contour of the ground, this causes automatic compensating adjustment of the two other actuator cylinders 74.

The common hydraulic pressure control circuit therefore provides automatic self-compensating adjustment of the actuator cylinders 74, when the respective packers 70 move up and/or down relative to their swivel couplings 73 as they follow the contour of the ground.

If desired, a respective seeding unit 100, shown in FIG. 4, may be integrated with each packer to form an integrated unit, to be movable therewith during packing operations and to carry out simultaneous seeding, and also being capable of moving with each packer during adjustment of its position when plough body reversal takes place.

It should be understood that a packer with packer rings or discs (as shown) is only one example of a soil preparation device which may be integrated with a respective plough section of a reversible plough/multiple soil preparation device combination according to the invention. Thus, other types of soil preparation device than "packers" (as will be well known to those of ordinary skill in the art) may be used in a combination of a reversible plough and multiple soil preparation device according to the invention.

I claim:

1. A combination comprising a reversible plough coupled with a plurality of soil preparation devices for connection to a propelling vehicle, said vehicle defining a direction of travel relative to the ground and said vehicle having lifting arms, said reversible plough comprising:

a headstock by means of which the combination can be mounted on said lifting arms at the rear of said propelling vehicle;

a plough frame including a carrying beam mounted on said headstock;

a number of pairs of reversible plough bodies mounted on said carrying beam and rotatable through approximately 180° in order to reverse the plough bodies of each pair;

each of said soil preparation devices comprising;

a plurality of working elements and a swivel coupling, said swivel coupling defining a swivel axis, said swivel axis being substantially horizontal and extending generally parallel to said direction of travel, said device pivoting about said swivel axis during plough body reversal;

said soil preparation device being mounted on a movable part of said plough frame which allows said soil preparation device to be towed by said vehicle and also to be suspended from said frame during plough body reversal, in which a common hydraulic pressure control circuit is provided to control the height of each soil preparation device relative to its swivel coupling, said circuit comprises an actuator cylinder associated with each soil preparation device, said actuator cylinder adjusting the height of said working elements of each device relative to said swivel mounting of said device, said cylinders being in fluid communication with each other whereby relative adjustment movement of one of said cylinders as a consequence of upward or downward movement of said respective soil preparation device to follow the contour of said ground causes automatic compensating adjustment of said other actuator cylinders.

2. A combination according to claim 1, in which said plough frame includes a number of separate plough sections, said soil preparation devices being coupled with at least some of said plough sections.

3. A combination according to claim 1, in which each soil preparation device comprises a packer.

4. A combination according to claim 1, in which a seeding unit is mounted on each soil preparation device to form an integrated unit, said seeding unit being adjustable during plough body reversal.

5. A combination according to claim 1, in which each soil preparation device comprises a mounting frame on which soil working elements are mounted and said mounting frame carries said swivel coupling, said actuator cylinders being mounted on said frame and being operative to pivot said frame relative to said swivel coupling about a transverse axis for height adjustment purposes.

* * * * *